United States Patent
Sauerwein et al.

(10) Patent No.: US 11,797,356 B2
(45) Date of Patent: Oct. 24, 2023

(54) MULTI-INSTRUMENT BEHAVIOR SYNCHRONIZATION USING JOBS AND MILESTONES

(71) Applicant: Tektronix, Inc., Beaverton, OR (US)

(72) Inventors: Timothy E. Sauerwein, Portland, OR (US); Clinton M. Alter, Portland, OR (US); Sean T. Marty, Beaverton, OR (US); Jenny Yang, Beaverton, OR (US); Keith D. Rule, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 149 days.

(21) Appl. No.: 17/019,146

(22) Filed: Sep. 11, 2020

(65) Prior Publication Data
US 2021/0081257 A1    Mar. 18, 2021

Related U.S. Application Data

(60) Provisional application No. 62/900,506, filed on Sep. 14, 2019.

(51) Int. Cl.
*G06F 9/46* (2006.01)
*G06F 9/52* (2006.01)

(52) U.S. Cl.
CPC ..................... *G06F 9/52* (2013.01)

(58) Field of Classification Search
CPC ........................................... G06F 9/52
See application file for complete search history.

(56) References Cited

U.S. PATENT DOCUMENTS 7,502,745 B1 *  3/2009  Shawver ............... G06Q 10/10
                                                   705/1.1
8,056,079 B1 * 11/2011  Martin .................. G06F 9/5027
                                                   718/107

OTHER PUBLICATIONS

German Patent and Trademark Office, Examination notice for DE application 10 2020 123 911.4, dated Jun. 15, 2021, 3 pages, Munich, Germany.

(Continued)

*Primary Examiner* — Gregory A Kessler
(74) *Attorney, Agent, or Firm* — Miller Nash LLP; Andrew J. Harrington

(57) ABSTRACT

A method of synchronizing tasks in a test and measurement system, includes receiving, at a client in the system, a task input, receiving, at a job manager running on a first device processor in the system, a call from the client to create a job associated with the task, returning to the client an action containing at least one job code block associated with the job, receiving a call for the action, executing the at least one job code block by at least one processor in the system, determining that the job has completed, and completing the task. A system of devices including at least one test and measurement device and a device controller, the device controller having at least one user input, a device controller processor configured to execute instructions, and at least one memory to store the data and to store instructions in the form of executable code, wherein the code causes the device controller processor to receive an input from a client, the input identifying a task, create a job associated with the task, return to the client an action containing at least one job code block associated with the task, receive a call for the action, determine that the job has completed, and notify the client that the job has completed.

11 Claims, 3 Drawing Sheets

(56) References Cited

OTHER PUBLICATIONS

Rajeev Singh, Java CompletableFuture Tutorial with Examples, web page <www.callicoder.com/java-8-completablefuture-tutorial/>, 1 page, Jul. 18, 2017, retrieved on Jul. 13, 2021.

* cited by examiner

MULTI-INSTRUMENT BEHAVIOR SYNCHRONIZATION USING JOBS AND MILESTONES

RELATED APPLICATIONS

This disclosure claims benefit of U.S. Provisional Application No. 62/900,506, titled "MULTI-INSTRUMENT BEHAVIOR SYNCHRONIZATION USING JOBS AND MILESTONES," filed on Sep. 14, 2019, which is incorporated herein by reference in its entirety.

TECHNICAL FIELD

This disclosure relates to test and measurement instruments, such as oscilloscopes, more particularly to systems and methods for synchronizing the operations of multiple instruments.

BACKGROUND

The Standard Commands for Programmable Instruments (SCPI; often pronounced "skippy") protocol defines a standard for syntax and commands to use in controlling programmable test and measurement devices. Two standard SCPI commands that are to be implemented in every device that supports SCPI are *OPC?, which is an operation complete query, and *WAI, which is a wait-to-continue command. These two standard commands, together with a *OPC command, are intended to be used to by a device controller, for example a computer-controlled automated test system, to synchronize the execution of its program with the actual operation of the device-under-test (DUT). This can be found in the scpi-99 specification Section 4.1.3.1.

However, it is well known in the test and measurement industry that, due to differing and inconsistent implementations of SCPI in various test and measurement instruments, instruments' responses to the *OPC, *WAI, and *OPC? commands do not behave in a predictable and reliable way. For example, some instruments will return a response to the operation complete query indicating that the instrument has completed an operation, when in reality it has not. Other instruments will actually complete an operation, but not return a timely response to the operation complete query. This inconsistent behavior has led many test engineers, and other authors of device controller programs, to insert various waits, delays, sleeps, and/or timeouts into their test programs to compensate for the differing responses of instruments. While these delay and timeouts are sometimes necessary for a test program to control some instruments, other times these delays and timeouts are extraneous, inefficient, and cause unnecessary reduction in the throughput of automated test systems, which can be a significant problem in manufacturing plants.

Embodiments of the disclosed apparatus and methods address shortcomings in the prior art.

DESCRIPTION

In general, embodiments of the disclosed technology provide settings and data synchronization within an instrument, between multiple instruments, and between a device controller client program and one or more instruments. Embodiments provide better notification of completion through the instruments' programmatic interface (PI) commands. This will make it so that no delays, time outs, or sleeps are required in automation code. This will make user tests more robust and considerably faster.

Figure 1:
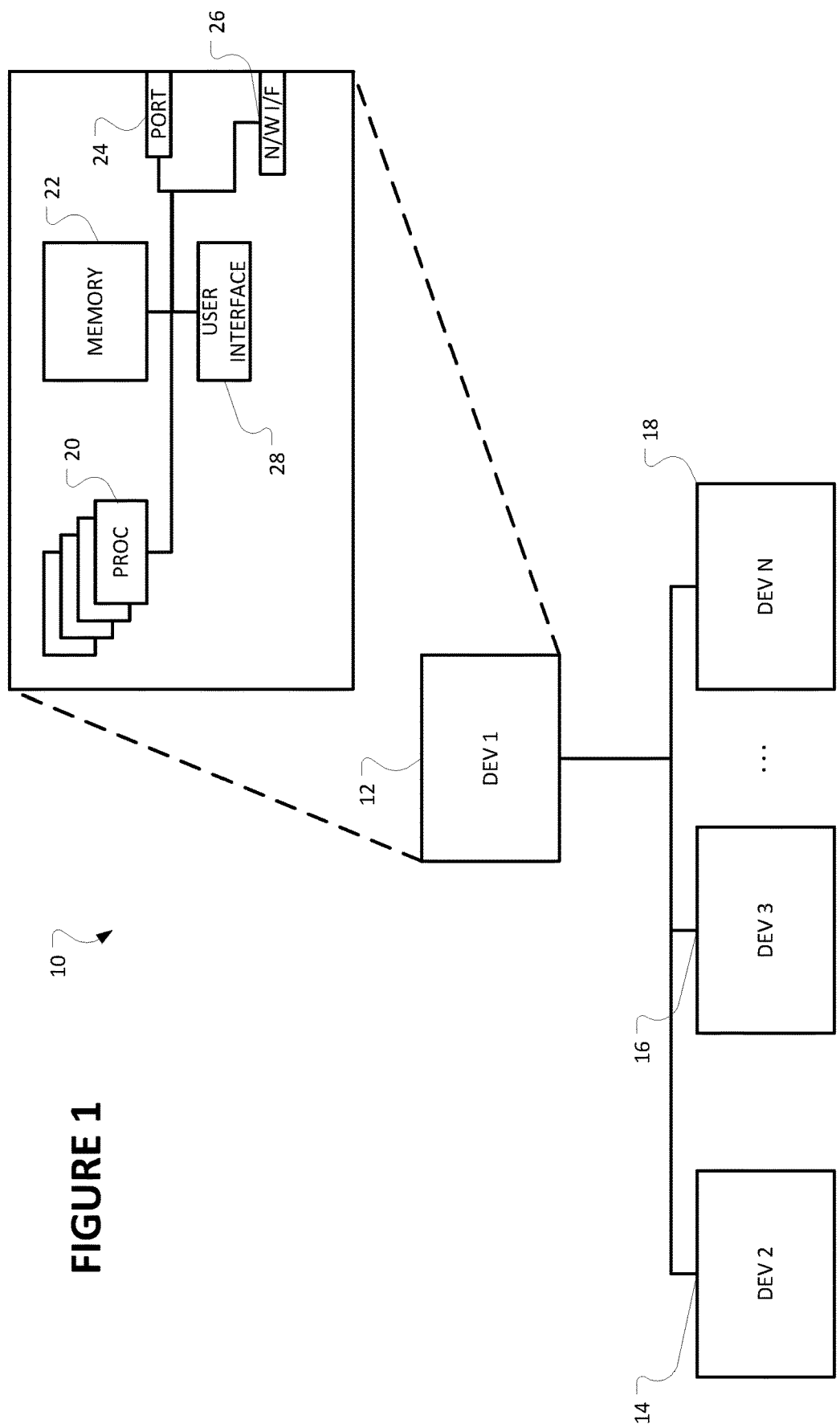
FIG. 1 shows an embodiment of a system having a device controller for synchronization.

FIG. 1 shows an embodiment of a system having a device controller that provide the synchronization. While the embodiment of FIG. 1 shows multiple devices, the embodiments may be implemented in a single device, where the single device may have one or more processors. The embodiments may be implemented in multiple devices, each of which may have one processor or multiple processors. None of the embodiments discussed here are intended to limit the implementation in any way and no limitation should be implied.

The system 10 shown in FIG. 1 has multiple devices 12, 14, 16 and 18, with many more devices possible. Each of these devices could be a test instrument, such as an oscilloscope, and one of the oscilloscopes may be designated as a device controller. Alternatively, and within the scope of the claims, one device may be a dedicated device controller that is not a test instrument, such as a general-purpose computing device, and the other devices may connect to it, in some cases through a network.

For the purposes of this discussion, one of the devices 12, is a test instrument that also acts as a device controller. The device 12 may have at least one processor 20, a memory 22 to store both the code to be executed by the one or more processors and any data received by the device. The device 12 will have one or more ports such as 24 that create a channel through which the device receives data, such as from a test probe or signal generator, for example. The device 12 may also have a network interface 26 that allows the device to connect to a network. The other devices 14, 16, 18 may connect to the device controller 12 through direct, wired connections, or wirelessly. The device 12 will typically have a user interface 28.

Many instrument systems use multiple threads, in order to do more than one task at a time. A "task" as that term is used here means a work item to complete. Tasks may include such items as a system adding a new measurement, displaying waveforms, and reacting to mouse input all at the same time. These are tasks and may all occur at the same time, but the threads processing each of these tasks may all need to cooperate.

For example, when the user resets to factory defaults, the thread that sends settings to the hardware wants to send the new settings as a block. To do so, this thread must be warned when many new settings are about to be computed, and then told when the new settings are ready to be sent.

As used here, the term "thread" means a smallest sequence of programmed instructions that can be managed independently by a scheduler. A thread is a component of a process. Multiple threads can exist within one processor. In terms of the discussion here, each processor may execute on multiple threads, threads may pass between processors within one device, or even between processors that reside on two different devices. Embodiments here improve the operation of the computing devices, whether they are test and measurement devices or general computing devices.

Figure 2:
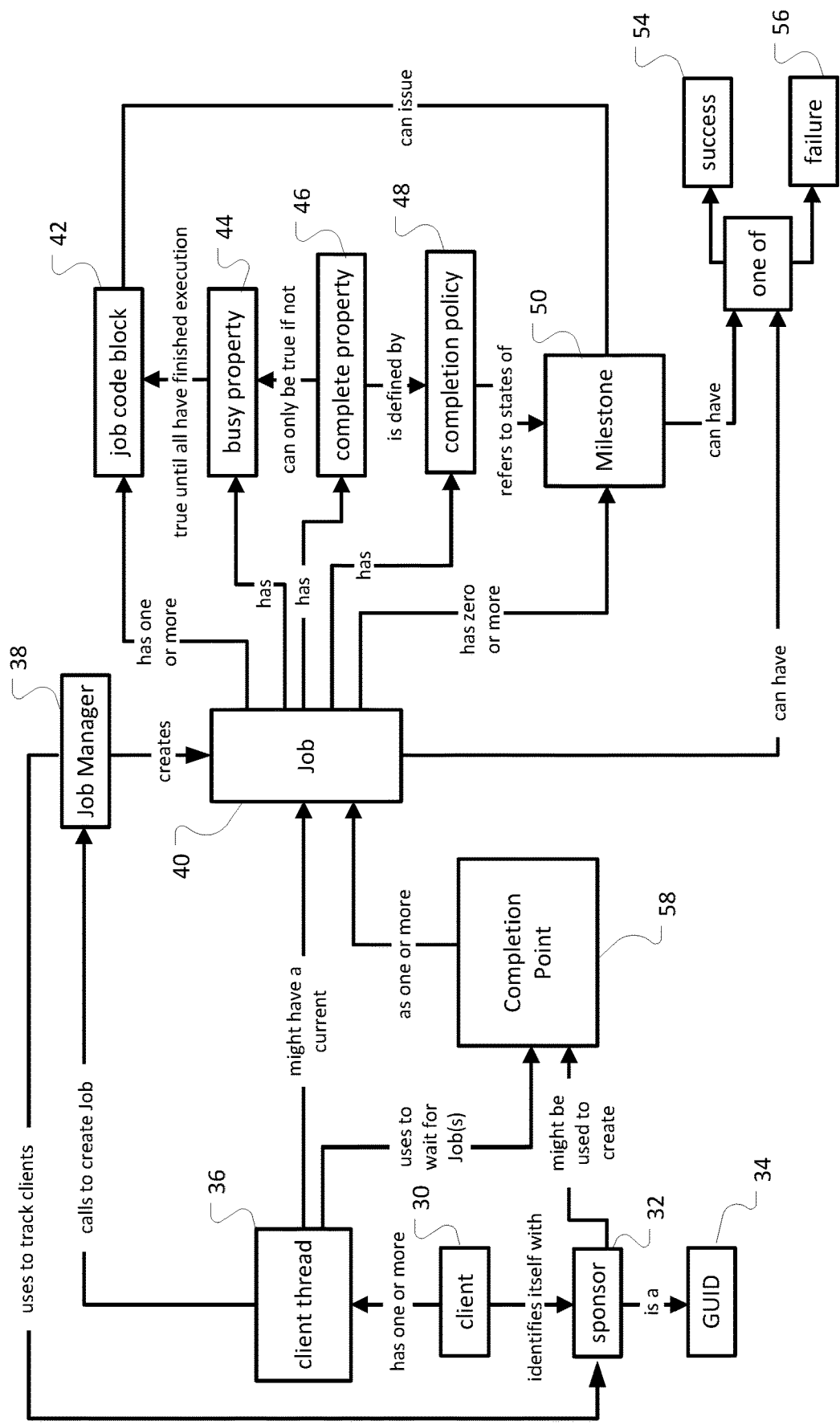
FIG. 2 shows an embodiment of an operating environment.

FIG. 2 provides an overall diagram of the environment in which the embodiments operate. Generally, an initial starting point for the improved operations starts with a client 30 that has one or more threads 36 that generate calls to create jobs to accomplish tasks using the system. As will be discussed in more detail later, the client may be associated with a sponsor 32, a parameter that identifies the client. This may consist of a globally unique identifier (GUID) or a universally unique identifier (UUID). The discussion below will use GUID 34.

The client thread may use completion points such as 58, which will be discussed in more detail later, to wait for job completions. The threads 36 generate calls that create the Jobs at the Job Manager 38. The Job Manager may receive status requests from the clients and uses the GUIDs to track them.

The Job Manager aids cooperation by having jobs that threads can wait for. A Job is for some specific task, such as computing the new settings needed for a reset to factory defaults. Many different threads might work on a Job as it proceeds. Other threads can wait for the Job to be done. For example, the thread that sends settings to the hardware can wait for the new settings to be calculated first.

The Programmatic Interface has a notion of Operation Complete that also relies on waiting for a Job. For example, a programmatic interface user might add a new measurement, wait for Operation Complete, and then query the measurement. Such a user wants to be sure that the new measurement has actually been computed on valid data. This ability of Operation Complete saves time and money for users, who would otherwise need to put delays in their PI test programs.

The Job 40 is the object associated with the task to be completed discussed above. A client calls the Job Manager to create a new Job. Then the client can use the Job object and share the Job object with other parts of the system. Jobs have some associated job code blocks 42, as explained further below. If not all of these associated blocks have finished executing, then the Job is considered to be busy as shown by the busy property 44. Jobs are always busy when they are first created, and then become not busy when all of the associated job code blocks have been executed and finished. Once a Job becomes not busy, there is not a way for it to become busy again.

Jobs can also be complete or not, shown as the complete property 46. In order to be complete, a Job must not be busy. But there are some additional requirements, as explained further below. Once a Job becomes complete, it can never cease to be complete. It is intended that all Jobs will eventually become complete. Completion may be defined by a completion policy 48, which may involve one or more Milestones 50.

Jobs complete with one of either success 54 or with failure 56. The choice depends on how certain Job-related entry points are called. Failure can have associated failure data, but success is a plain fact without any associated data. This may involve completion points 58, as discussed below.

Clients can use a Job object to find out if the Job is busy, complete, successful, or failed. Clients can also adjust the Job's definition of completion, as explained further below. Clients can register to be notified when a Job completes, and can also wait until a Job completes.

Figure 3:
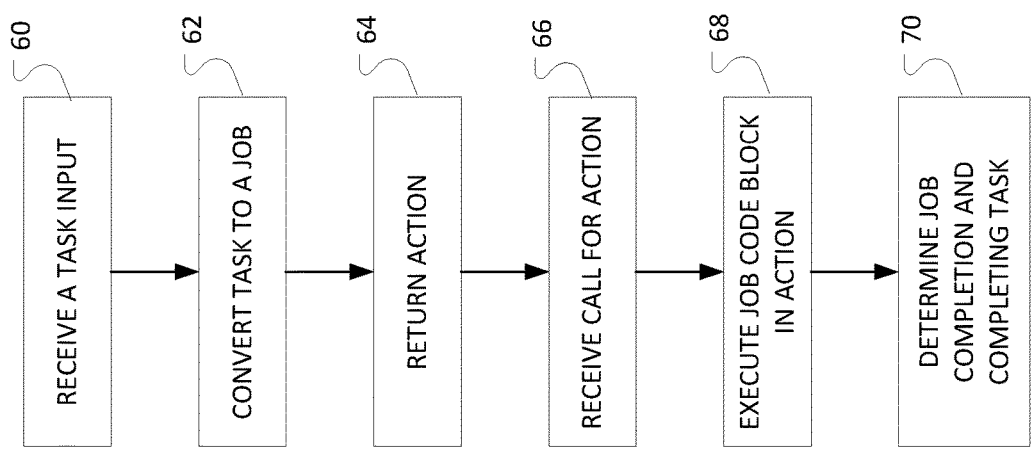
FIG. 3 shows a flowchart of an embodiment of a method of managing jobs in an operating environment.

Job code blocks, in an exemplary embodiment may be a .NET System.Action. In other words, a job code block must be a C# delegate that has no parameters and returns void. In conjunction with the environment of FIG. 1, FIG. 3 shows a flowchart of an embodiment of the overall process.

The client receives some sort of task input at 60. The client calls the Job Manager to create a Job at 62, and the client specifies one job code block for the Job. The resulting Job starts out with exactly the one job code block in its set of job code blocks.

As a job code block executes, it might call the Job Manager to create another job code block. In that case, the new job code block is added to the Job of the job code block that is currently executing. So this call has the effect of extending the Job to include additional job code blocks. These ways are the only ways to create job code blocks. In particular, a client cannot add job code blocks to a Job from the outside.

When a client calls the Job Manager to create a Job, the Job Manager also returns an action at 64. An example of this action may consist of a wrapped action, such as a .NET System.Action object that has the job code block inside. The Job Manager does not automatically call the job code block on its own. Instead, someone, such as a client, another thread, etc., must call the action at 66, which invokes the job code block that is inside.

The client might choose to call the action directly. In one embodiment, another choice might be to pass the wrapped action into a .NET System.Threading.Tasks.Task that calls the action. In any case, the Job will remain busy at least until the action gets called and then the job code block is executed at 68 and returns.

When a job code block extends the Job, by calling the Job Manager to add another job code block, the situation is similar. The Job Manager returns an action, and the caller is responsible to arrange for that action to be called one way or another.

This process may have several guidelines that allow for the improvements in completing Jobs here. For example, actions must be called exactly once; calling an action a second time raises an error.

A Job starts out as busy, and eventually becomes not busy, without any possibility of becoming busy a second time.

Client code has control of when and how job code blocks are created, and can choose how the job code blocks are allocated to threads of execution.

The Job Manager considers that a thread might have an associated Job. The Job Manager provides an entry point that returns the Job which is associated with the caller's thread. This entry point returns null if there is no associated Job. If a thread is executing the job code block of a Job, then that Job is the one associated with the thread at that moment. If the same thread later executes the job code block of a different Job, then the Job associated with the thread changes to that second Job. So at different times a thread might have different Jobs, or even no Job at all.

Determining Job completion that then leads to completion of a task at 70 may take different paths. Referring back to FIG. 2, the Job may include Milestones. A "Milestone" is provided by the Job Manager. A Milestone stands for a Job result that comes from collaboration with another non-Job activity. For example, in a Job that adds a new measurement the user might want completion to mean that the new measurement has been computed. In this example, the Job must collaborate with the subsystem that computes measurements. In order to separate concerns between the Job and the subsystem, it seems natural for the Job to pass a Milestone, which the subsystem uses to note when the new measurement has been computed.

A Milestone is always part of exactly one Job. In one embodiment, a Milestone may be classified as either a settings milestone or a data milestone. Other types of Milestones may exist in the system, or new types may be created. A Milestone starts out as an incomplete Milestone, and becomes completed by either succeeding or failing.

The Job Manager provides an entry point for creating a Milestone. The Milestone is always for the Job that is associated with the calling thread. In other words, a job code block is executing, and creates a Milestone for its Job. Here, this operation is described as the Job issues the Milestone. In one instance, it could also happen that the calling thread has no associated Job. In this case the Job Manager produces a dummy Milestone that does nothing. This arrangement is so that code need not test whether it is executing from a job code block.

Since a Job can only issue Milestones from its job code blocks, only busy Jobs can issue Milestones. Once a Job ceases to be busy, its set of Milestones can no longer change. This property makes it easier to reason about Job completion.

On the other hand, any code can complete a Milestone, either by making it succeed or by making it fail. Once completed, a Milestone ignores any further attempts to complete it, and can never become incomplete again.

Job failure occurs in one of two ways. First, a client calls an entry point in the Job Manager to declare that the Job associated with the caller's thread has failed. Such a client can optionally pass a failure status datum to be associated with the failure. It could happen that the caller's thread has no associated Job. In this case the call does nothing. This arrangement is so that code need not test whether it is executing from a job code block. Second, a client calls a Milestone method to declare that the Milestone has failed, which causes the associated Job to fail.

As mentioned above, Jobs may include a completion policy. A completion policy is the rule that a Job uses to decide when the Job has completed. This policy is a property of the Job. Different Jobs can have different policies. The client must specify the completion policy when calling the Job Manager to create the Job. After the Job is created, any client with access to the Job object can change the Job's completion policy.

All completion policies share the following rules. First, a Job that fails instantly becomes complete, whether it is busy or not. Second, no Job can succeed until it ceases to be busy.

In one embodiment the client can designate one of three completion policies. First, a Settings policy means the Job succeeds when it is no longer busy and all of its settings Milestones have succeeded. Second, DataIfRunningAndSettings policy means the Job succeeds when it is no longer busy, when all of its settings Milestones have succeeded, and when either acquisitions are not running or else all of the data Milestones have succeeded. Third, DataAndSettings means the Job succeeds when it is no longer busy, and when all of its settings and data Milestones have succeeded. These are just examples of completion policies, no limitation to any particular completion policy is intended, nor should any be implied.

Figure 4:
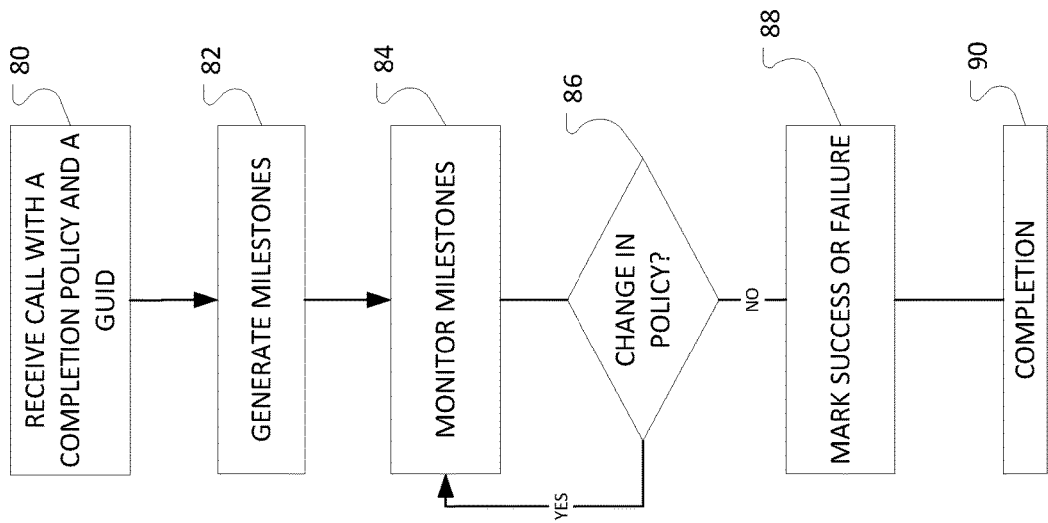
FIG. 4 shows a flowchart of an embodiment of a method of using milestones to manage job completion.

A client can change the completion policy of a Job, so the Job might become complete even though no other conditions have changed. For example, in the addition of a measurement mentioned above, the Job that adds the measurement might choose the DataIfRunningAndSettings policy. But if the code finds that only reference waveforms are involved, it might decide to change the policy to DataAndSettings, in order to insist on a measurement result even when acquisitions are not running. FIG. 4 shows a flowchart of an embodiment of a process to use milestones to manage job completion.

At 80, the Job Manager receives a call from a client that specifies a completion policy and provides the GUID as part of the sponsor parameter. As discussed above, the Job Manager provides the entry points for any Milestones at 82. The Job Manager then monitors the Milestones at 84. The Job Manager receives notification that the Milestones are completed. As discussed earlier, the client may change the completion policy at 86, so the Job Manager tracks the Milestones to ensure any of both the data Milestones and the settings Milestones are completed. If the client has changed the completion policy at 86 and the settings Milestones are completed, for example, the Job Manager may mark the Job as successful at 88 and then completed at 90. The Job will be marked as completed even if it fails.

Even if the client does not change the completion policy, and all the Milestones are completed, the Job Manager will determine success at 86 and then complete the Job at 88.

Once a Job becomes complete for any reason, it cannot become incomplete again. Also, a Job that has failed cannot later succeed, and a Job that has succeeded cannot later fail. It is also possible for a Job to partially complete. For example, suppose a Job issues both settings Milestones and data Milestones. One might want to wait for only the settings Milestones in one place, and yet to have ultimate completion mean that both kinds of Milestones are complete. Partial completion handles the first case, to wait for only the settings Milestones.

In partial completion, the client specifies which kinds of Milestones to include. The Job is considered partially complete when it is no longer busy and when all milestones of the specified kind have completed. A Job that has failed is also considered to be partially complete.

Another means of managing completion involves the use of a "Completion Point," an abstract datatype provided by the Job Manager. The Completion Point represents the ability to wait for a Job, or sometimes several Jobs, to be complete or partially complete. The Completion Point can also test for completion without waiting.

Completion Points may rest on a Job or a client. For example, the client may get a Completion Point from a Job object. In this case, the Completion Point waits only for that one Job. In another embodiment, the client may ask the Job Manager for a Completion Point that waits for all Jobs that the client has created up to the moment of asking. In this case, the Completion Point waits, using just one operation, for completion, or partial completion, of all of the client's Jobs together.

Because the Completion Point may rest on a client, the Job Manager must keep track of its clients. To do so, the client must identify itself, using the sponsor parameter mentioned above, when the client creates a Job. This sponsor parameter in these embodiments consists of a global unique identifier (GUID) chosen by the client. Later, when the client calls the Job Manager to get a Completion Point for all jobs so far, the client identifies itself again by passing the sponsor parameter. The Job Manager can service the client's request because the Job Manager keeps track of the sponsor for each Job.

When the client waits for the completion of all Jobs so far, the notion of completion for each of the Jobs depends on the completion policy of that particular Job. So, in this case, completion could mean different things for different Jobs in the set. On the other hand, if a client waits for partial completion of all Jobs so far, then the partial completion means the same thing for each Job in the set.

In this manner, the system performance can be improved by the addition of the Job Manager to manage client requests and coordinate operations in the system. This eliminates or mitigates the need to build in delays or stops in the processing, as well as the guess work those may involve. In the example given above, where the user wants to add a new measurement, instead of the user having to build in a delay for that new measurement and not really knowing for sure that the measurement has been completed. In the system here, the Job Manager will complete the Job of the new measurement and then inform the system that the Job is completed, ensuring that the measurement was computed on valid data.

Examples of the disclosure may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Electrically Erasable Programmable Read-Only Memory (EEPROM), Random Access Memory (RAM), etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 is a method of synchronizing tasks in a test and measurement system, comprising: receiving, at a client in the system, a task input; receiving, at a job manager running on a first device processor in the system, a call from the client to create a job associated with the task; returning to the client an action containing at least one job code block associated with the job; receiving a call for the action; executing the at least one job code block by at least one processor in the system; determining that the job has completed; and completing the task.

Example 2 is the method of Example 1, wherein the first device processor resides in a controller device and the at least one processor in the system resides on a test and measurement device in the system.

Example 3 is the method of either of Examples 1 or 2, wherein the call from the client includes a completion policy, and determining that the job has completed comprises determining if the completion policy has been met.

Example 4 is the method of Example 3, wherein the completion policy has been met by one of a job failure or a job success.

Example 5 is the method of Example 4, wherein a job success occurs when the job is no longer busy and one of: all settings milestones have succeeded; all settings milestones have succeeded and one of either no data acquisitions are occurring, or all data milestones have succeeded; and all settings milestones and data milestones have succeeded.

Example 6 is the method of any of Examples 1-4, wherein executing the at least one job code block comprises creating at least one additional job code block.

Example 7 is the method of any of Examples 1-5, further comprising passing, from the client, the action to one of either a different thread within the same processor or a thread within a different processor in the system.

Example 8 is the method of any of Examples 1-6, wherein executing the at least one job code block includes issuing a milestone having a unique identifier, the milestone to be completed outside the job associated with the at least one job code block.

Example 9 is the method of Example 8, further comprising receiving notification that the milestone has been completed.

Example 10 is the method of Example 8, wherein the unique identifier is provided to the job manager, and the job manager tracks the milestone by its unique identifier across multiple devices.

Example 11 is a system of devices including at least one test and measurement device and a device controller, the device controller comprising: at least one user input; a device controller processor configured to execute instructions; at least one memory to store the data and to store instructions in the form of executable code, wherein the code causes the device controller processor to: receive an input from a client, the input identifying a task; create a job associated with the task; return to the client an action containing at least one job code block associated with the task; receive a call for the action; determine that the job has completed; and notify the client that the job has completed.

Example 12 is the system of Example 11, wherein the device controller processor comprises one of either one or more processors in the device controller separate from the test and measurement device, or one or more processors in the test and measurement device.

Example 13 is the system of either Examples 11 or 12, further comprising at least one processor in the system other than the device controller processor executing the at least one job code block.

Example 14 is the system of Example 13, wherein the at least one processor comprises multiple processors, and the at least one job code block is executed in part by more than one of the multiple processors.

Example 15 is the system of Examples 13, wherein either the at least one processor contains multiple threads, or the at least one processor comprises multiple processors having at least one thread, and the at least one processor executing the at least one job code block comprises multiple threads executing the at least one job code block.

Example 16 is a non-transitory storage medium comprising a computer program product, the computer program product including instructions that when executed by at least one processor in a test system cause the at least one processor to: receive from a client a task based on a user input; execute one or more operations to convert the task into a job; return to the client an action containing at least one job code block associated with the job; receive a call for the action; cause execution of the at least one job code block by at least one processor in the test system; determine that the job has completed; and complete the task.

Example 17 is the storage medium of Example 16, wherein the task has an associated completion policy and determining that the job has completed comprises determining if the completion policy has been met.

Example 18 is the storage medium of either of Example 17, wherein the completion policy has been met by one of a job failure or a job success.

Example 19 is the storage medium of Example 18, wherein a job success occurs when the job is no longer busy and one of: all settings milestones have succeeded; all setting milestones have succeeded and one of either no data acquisitions are occurring, or all data milestones have succeeded; and all settings milestones and data milestones have succeeded.

Example 20 is the storage medium of any of Examples of any of Examples 16-19, wherein execution of the at least one job code block includes issuing a milestone having a unique identifier, the milestone to be completed outside the job associated with the job code block.

Although specific embodiments have been illustrated and described for purposes of illustration, it will be understood that various modifications may be made without departing from the spirit and scope of the disclosure. Accordingly, the invention should not be limited except as by the appended claims.

What is claimed is:

1. A method of synchronizing tasks in a test and measurement system, comprising:
receiving, at a client in the system, a task input;
receiving, at a job manager running on a first device processor in the system, a call from the client to create a job associated with the task;
returning to the client an action containing at least one job code block associated with the job;
receiving a call for the action;
executing the at least one job code block by at least one processor in the system after receiving the call for the action;
determining that the job has completed; and
completing the task.

2. The method as claimed in claim 1, wherein the first device processor resides in a controller device and the at least one processor in the system resides on a test and measurement device in the system.

3. The method as claimed in claim 1, wherein the call from the client includes a completion policy, and determining that the job has completed comprises determining if the completion policy has been met.

4. The method as claimed in claim 3, wherein the completion policy has been met by one of a job failure or a job success.

5. The method as claimed in claim 4, wherein a job success occurs when the job is no longer busy and one of: all settings milestones have succeeded; all settings milestones have succeeded and one of either no data acquisitions are occurring, or all data milestones have succeeded; and all settings milestones and data milestones have succeeded.

6. The method as claimed in claim 1, wherein executing the at least one job code block comprises creating at least one additional job code block.

7. The method as claimed in claim 1, further comprising passing, from the client, the action to one of either a different thread within the same processor or a thread within a different processor in the system.

8. The method as claimed in claim 1, wherein executing the at least one job code block includes issuing a milestone having a unique identifier, the milestone to be completed outside the job associated with the at least one job code block.

9. The method as claimed in claim 8, further comprising receiving notification that the milestone has been completed.

10. The method as claimed in claim 8, wherein the unique identifier is provided to the job manager, and the job manager tracks the milestone by its unique identifier across multiple devices.

11. A method of synchronizing tasks in a test and measurement system, comprising:
- receiving, at a client in the system, a task input;
- receiving, at a job manager running on a first device processor in the system, a call from the client to create a job associated with the task, the job including a completion policy;
- returning to the client an action containing at least one job code block associated with the job;
- receiving a call for the action;
- executing the at least one job code block by at least one processor in the system;
- determining that the completion policy has been met so the job has completed; and
- completing the task.

* * * * *